(12) United States Patent
Knoll et al.

(10) Patent No.: US 9,734,615 B1
(45) Date of Patent: Aug. 15, 2017

(54) ADAPTIVE TEMPORAL SAMPLING

(71) Applicant: Lucasfilm Entertainment Company Ltd., San Francisco, CA (US)

(72) Inventors: John Knoll, San Rafael, CA (US); Victor Schutz, IV, Novato, CA (US); Mark Nettleton, Sausalito, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 159 days.

(21) Appl. No.: 13/831,092

(22) Filed: Mar. 14, 2013

(51) Int. Cl.
| | |
|---|---|
| G06T 15/00 | (2011.01) |
| G06T 9/00 | (2006.01) |
| G06T 13/00 | (2011.01) |
| G06T 13/20 | (2011.01) |
| G06T 7/00 | (2017.01) |
| G06T 19/00 | (2011.01) |
| G06T 15/20 | (2011.01) |
| G06T 7/20 | (2017.01) |

(52) U.S. Cl.
CPC ............... *G06T 13/20* (2013.01); *G06T 7/20* (2013.01); *G06T 9/004* (2013.01); *G06T 13/00* (2013.01); *G06T 15/20* (2013.01); *G06T 19/00* (2013.01)

(58) Field of Classification Search
None
See application file for complete search history.

(56) References Cited

U.S. PATENT DOCUMENTS

| | | | |
|---|---|---|---|
| 5,745,636 A * | 4/1998 | Shashua et al. | 386/326 |
| 6,686,918 B1 * | 2/2004 | Cajolet et al. | 345/473 |
| 8,842,730 B2 * | 9/2014 | Zhou et al. | 375/240.12 |
| 2004/0155847 A1 * | 8/2004 | Taoka et al. | 345/87 |
| 2011/0018880 A1 * | 1/2011 | Whited | G06T 11/203 345/473 |
| 2011/0181606 A1 * | 7/2011 | Sumner et al. | 345/474 |
| 2012/0021828 A1 * | 1/2012 | Raitt | A63F 13/12 463/31 |

OTHER PUBLICATIONS

Chen et al. "Light Source Interpolation for Sparsely Sampled Reflectance Fields", 2005, Stanford University.*

* cited by examiner

*Primary Examiner* — Mark Zimmerman
*Assistant Examiner* — Yu-Jang Tswei
(74) *Attorney, Agent, or Firm* — Kilpatrick Townsend & Stockton LLP

(57) ABSTRACT

An animation analyzer is configured to receive an animation sequence and to identify a subsample of the frames that are to be rendered. A rendering engine is configured to render the subsample of the frames. The rendering engine is further configured to identify the frames that have not been rendered and to generate in-betweens for the frames that have not been rendered. The rendering engine is further configured to assemble the subsample of frames and the in-betweens into a video sequence depicting the animation sequence.

17 Claims, 6 Drawing Sheets

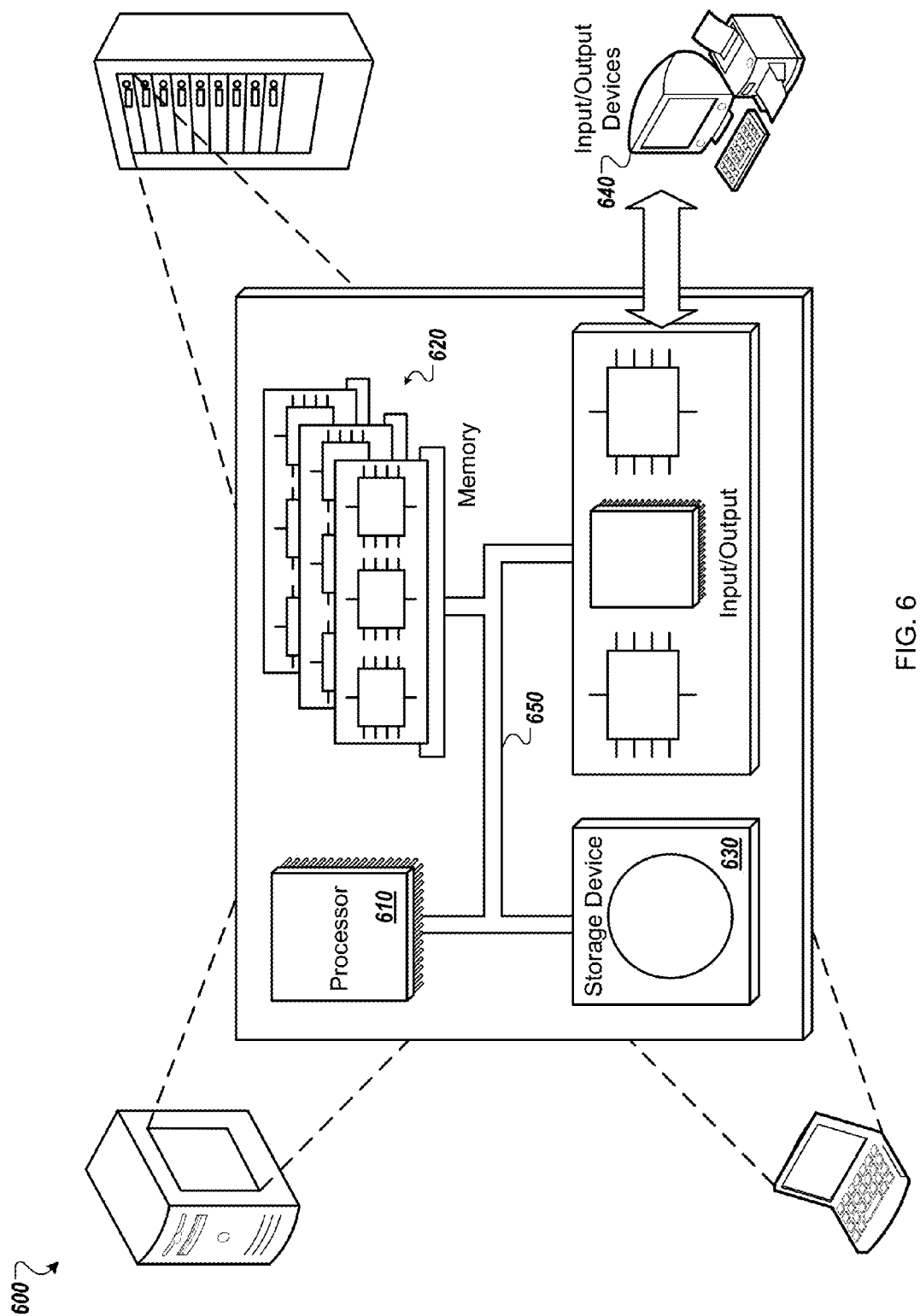

ADAPTIVE TEMPORAL SAMPLING

BACKGROUND

This specification relates to computer animation.

Artists and film-makers use three-dimensional "3D" computer graphics software to create 3D computer-generated images and animations. Animators typically use multiple computer programs, including 3D editors and non-linear editors to create 3D images and animations. 3D editors (including 3D modeling, animation, layout, and rendering programs, and the like) allow a user to create and manipulate 3D models, e.g., mathematical representations of 3D objects. The user can combine 3D models to create a 3D scene 101 as shown in FIG. 1. The 3D scene 101 includes an environment, cameras 103, lighting, and props 107. The environment is the setting of a scene, for example, an office, a house, or a park. The cameras 103 are virtual cameras, e.g., computer simulated cameras that define a perspective or point-of-view to render a 3D scene from. The props 107 are 3D models of objects that are in the scene for a particular shot, for example, people and cars. Some 3D editors allow a user to create an ordered sequence of rendered two-dimensional "2D" images of a 3D scene, commonly referred to as a clip or a take.

Once a user has created one or more clips, a conventional non-linear editor allows the user to arrange and modify the clips along a timeline. A user can combine multiple clips to create a time-ordered sequence of clips, commonly called a sequence. The editor is non-linear in the sense that it can randomly access frames or clips within the sequence. Non-linear editors can include other tools, for example, tools to apply video effects such as fading in or out.

Some animators begin animation by creating 3D scenes and shooting (rendering from the point-of-view of a virtual camera) multiple clips of those scenes. Then, when the animator is finished manipulating 3D objects and shooting clips, the clips are combined in a non-linear editor to create sequences and ultimately a finished animation. This creation process is familiar to traditional film directors, who shoot scenes in real life with real cameras and then combine the footage in a non-linear editing environment after filming is completed.

SUMMARY

In one aspect, a computer system includes an animation analyzer configured to receive an animation sequence that includes motion information for a plurality of frames for a 3D virtual scene. The animation analyzer is further configured to identify a subsample of the frames that are to be rendered. The animation analyzer is further configured to send, to a rendering engine, an indication of the subsample. The system further includes the rendering engine configured to receive the animation sequence. The rendering engine is further configured to receive, from the animation analyzer, the indication of the subsample. The rendering engine is further configured to render the subsample of the frames. The rendering engine is further configured to identify the frames that have not been rendered. The rendering engine is further configured to generate in-betweens for the frames that have not been rendered. The rendering engine is further configured to assemble the subsample of frames and the in-betweens into a video sequence depicting the animation sequence.

Implementations can include any, all, or none of the following features. To identify the subsample, the animation analyzer is configured to identify, for each frame of the animation sequence, a largest absolute value of a motion vector describing the movement of a pixel from a current frame of the animation sequence to a next frame of the animation sequence; and identify, for each frame, a subsample rate based on the identified largest absolute value. To identify the subsample, the animation analyzer is configured to include some frames in the subsample based on the contents of the 3D virtual scene. The render engine receives, for each of the frames, a vector map describing the movement of the pixels from a current frame of the animation sequence to a next frame of the animation sequence; and wherein, to generate the in-betweens, the render engine is configured to use the vector map to warp pixels of the subsample of the frames. The render engine receives occlusion data for each of the rendered frames, the occlusion data stored in two masks for each rendered frame; and wherein, to generate the in-betweens, the render engine is configured to use the occlusion data to select for source pixels of a rendered frame to warp. A pixel of an in-between is generated using a previous and a following rendered frames if the pixel is not occluded in either the previous or following rendered frames; a pixel of an in-between is generated using only the previous rendered frame if the pixel is occluded in the following rendered frame and not occluded in the previous rendered frame; and a pixel of an in-between is generated using only the following rendered frame if the pixel is occluded in the previous rendered frame and not occluded in the following rendered frame. The animation analyzer is further configured to identify a second subsample of the frames that are to be virtually lit; and send, to the rendering engine, an indication of the second subsample; and wherein the rendering engine is further configured to receive, from the animation analyzer, the indication of the second subsample; light the second subsample of the frames; identify the frames that have not been lit; and apply in-between lighting for the frames not in the second subsample.

In one aspect, a computer implemented method includes receiving an animation sequence that includes motion information for a plurality of frames for a 3D virtual scene. The method further includes identifying, by an animation analyzer, a subsample of the frames that are to be rendered. The method further includes sending, to a render engine, an indication of the subsample such that the render engine is able to i) render the subsample of the frames; ii) generate in-betweens for the frames that have not been rendered; and iii) assemble the subsample of frames and the in-betweens into a video sequence depicting the animation sequence.

Implementations can include any, all, or none of the following features. Identifying the subsample includes identifying, for each frame of the animation sequence, a largest absolute value of a motion vector describing the movement of a pixel from a current frame of the animation sequence to a next frame of the animation sequence; and identifying, for each frame, a subsample rate based on the identified largest absolute value. Identifying the subsample includes including include some frames in the subsample based on the contents of the 3D virtual scene. The method including identifying a second subsample of the frames that are to be virtually lit; and sending, to the rendering engine, an indication of the second subsample such that the render engine is able to i) light the second subsample of the frames; ii) identify the frames that have not been lit; and apply in-between lighting for the frames not in the second subsample.

In one aspect, a computer implemented method includes receiving an animation sequence that includes motion information for a plurality of frames for a 3D virtual scene. The method further includes receiving, from an animation analyzer, the indication of a subsample of the frames that are to be lit. The method further includes lighting, by a render engine, the subsample of the frames. The method further includes identifying the frames that have not been lit. The method further includes generating, by the render engine, in-betweens for the frames that have not been lit. The method further includes assembling the subsample of frames and the in-betweens into a video sequence depicting the animation sequence.

Implementations can include any, all, or none of the following features. The method including receiving, for each of the frames, a vector map describing the movement of the pixels from a current frame of the animation sequence to a next frame of the animation sequence; and wherein generating the in-betweens includes using the vector map to warp pixels of the subsample of the frames. A pixel of an in-between is generated using a previous and a following rendered frames if the pixel is not occluded in either the previous or following rendered frames; a pixel of an in-between is generated using only the previous rendered frame if the pixel is occluded in the following rendered frame and not occluded in the previous rendered frame; and a pixel of an in-between is generated using only the following rendered frame if the pixel is occluded in the previous rendered frame and not occluded in the following rendered frame. The method including receiving, from the animation analyzer, the indication of a second subsample of frames that are to be rendered; rendering the second subsample of frames; identifying the frames that have not been rendered; and generating in-betweens for the frames that have not been rendered.

In one aspect, a computer system includes an animation analyzer configured to receive an animation sequence that includes motion information for a plurality of frames for a 3D virtual scene. The animation analyzer is further configured to identify a subsample of the frames that are to be lit. The animation analyzer is further configured to send, to a rendering engine, an indication of the subsample. The system further includes the rendering engine configured to receive the animation sequence. The render engine is further configured to receive, from the animation analyzer, the indication of the subsample. The render engine is further configured to lighting the subsample of the frames. The render engine is further configured to identify the frames that have not been lit. The render engine is further configured to generate in-betweens for the frames that have not been lit. The render engine is further configured to assemble the subsample of frames and the in-betweens into a video sequence depicting the animation sequence.

Implementations can include any, all, or none of the following features. To identify the subsample, the animation analyzer is configured to identify, for each frame of the animation sequence, a largest absolute value of a motion vector describing the movement of a pixel from a current frame of the animation sequence to a next frame of the animation sequence; and identify, for each frame, a subsample rate based on the identified largest absolute value. To identify the subsample, the animation analyzer is configured include some frames in the subsample based on the contents of the 3D virtual scene. The render engine received, for each of the frames, a vector map describing the movement of the pixels from a current frame of the animation sequence to a next frame of the animation sequence; and wherein, to generate the in-betweens, the render engine is configured to use the vector map to warp pixels of the subsample of the frames. The render engine receives occlusion data for each of the lit frames, the occlusion data stored in two masks for each lit frame; and wherein, to generate the in-betweens, the render engine is configured to use the occlusion data to select for source pixels of a lit frame to warp.

Particular embodiments of the subject matter described in this specification can be implemented so as to realize one or more of the following advantages. By animating every frame of a sequence, then rendering only a subsample of the frames, rendering time for a sequence can be reduced. Generating in-betweens by warping the rendered frames can be generated faster than rendering the corresponding frames, which can result in faster production of a video sequence. Similarly, lighting of a subsample of frames and generating in-betweens can reduce the production time of a video sequence.

The details of one or more implementations are set forth in the accompanying drawings and the description below. Other features and advantages will be apparent from the description and drawings, and from the claims.

BRIEF DESCRIPTION OF THE DRAWINGS

FIG. 6 is a schematic diagram that shows an example of a computing system.

Like reference symbols in the various drawings indicate like elements.

DETAILED DESCRIPTION

In the creation of a video sequence from an animated 3D scene, only a subsample of the animated frames may be rendered. The un-rendered frames may be created by warping preceding rendered frames, following rendered frames, or both, based on the animation of the 3D scene. These frames may be referred to as in-betweens. Similarly, only a second subsample of frames may be lit. The unlit frames can have lighting applied by warping preceding lit frames, following lit frames, or both.

To identify the subsample to be rendered and the subsample to be lit, which may be the same subsample, an animation analyzer can examine the animated 3D scene and select which frames are to be rendered and/or lit. The animation analyzer may consider, for example, motion vectors of pixels in a viewport of a virtual camera of the 3D scene and/or some properties of the objects in the 3D scene (e.g., reflectivity or translucence). The animation analyzer may pass an identifier of the subsample to a render engine, which can render and light the indicated subsamples of frames and generate the in-betweens as needed. Alternatively, a human user may identify the subsample to be rendered and the subsample to be lit. For example the user may assign subsample rates or identify individual frames to be included in the subsample to be rendered and the subsample to be lit.

Figure 1:
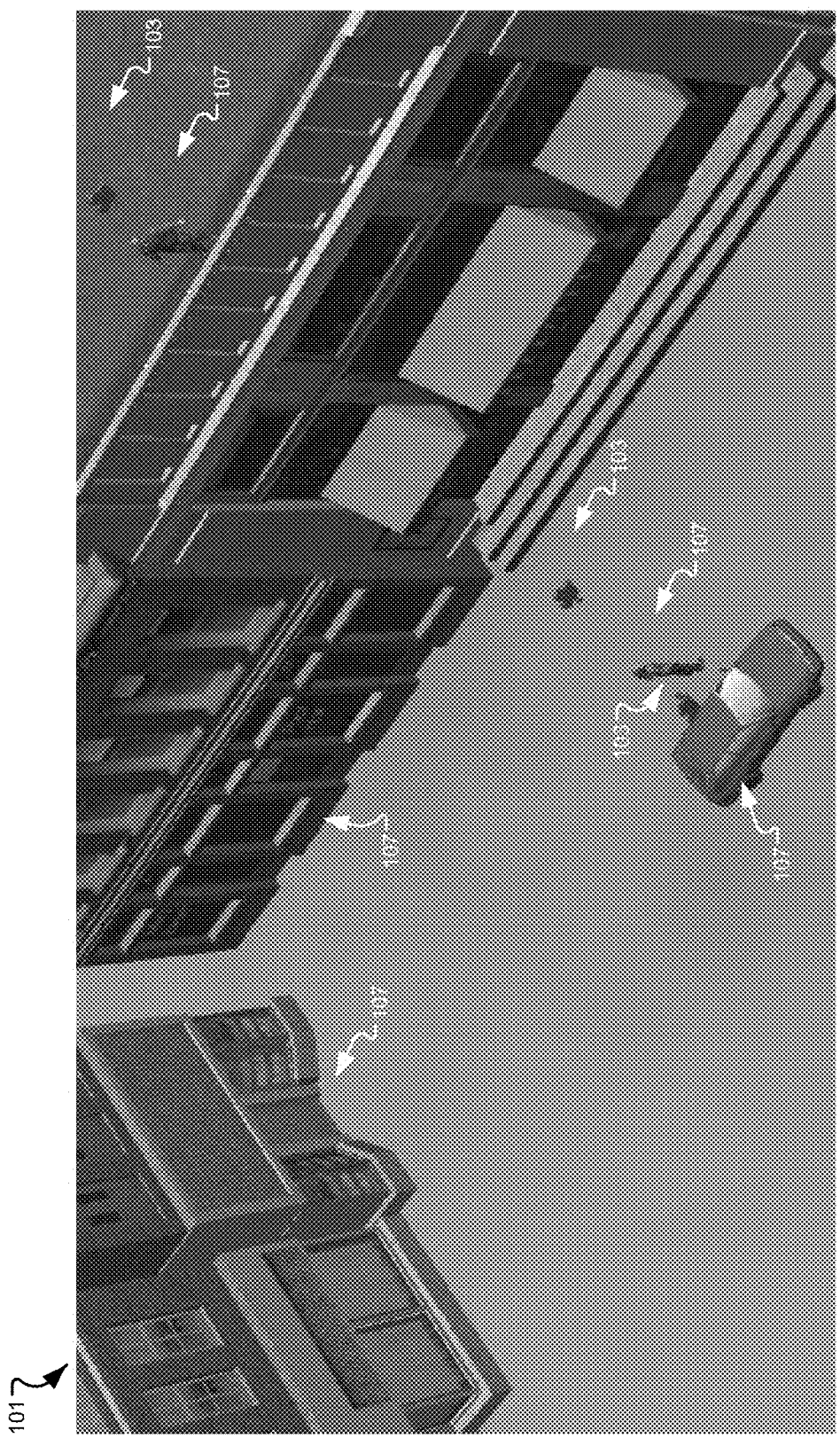
FIG. 1 is an image of an example 3D scene.
Figure 2:
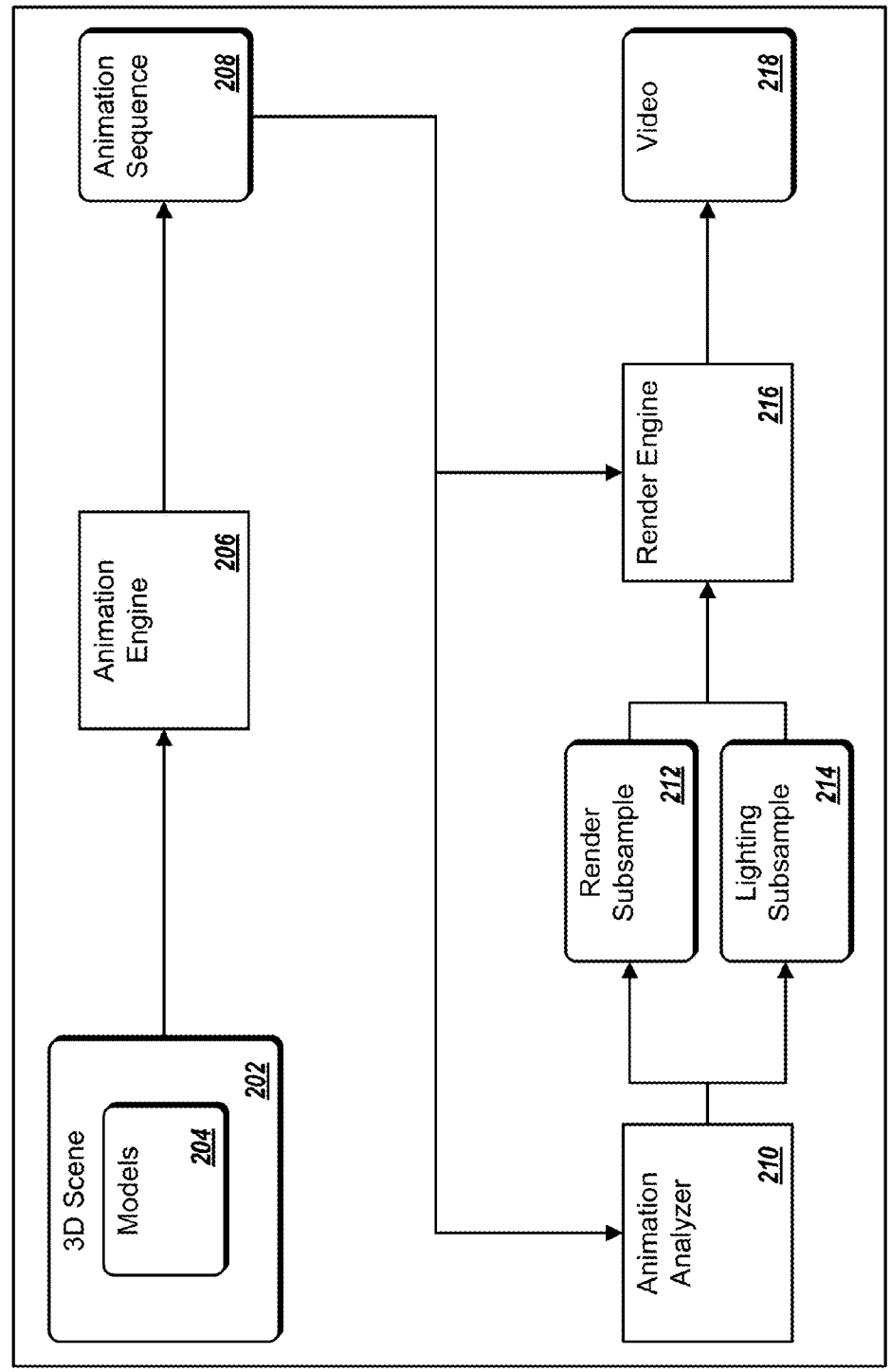
FIG. 2 is a block diagram of an example system for generating a video from an animated 3D scene.

FIG. 2 is a block diagram of an example system 200 for generating a video from an animated 3D scene. The system 200 includes data and computer systems that may be part of one or more computing devices (e.g., computing system 600 of FIG. 6). The system 200 may be used, in whole or in part, by a number of different types of users. In this specification, the system 200 will be described as a part of a single computer system used by users described in terms of professional roles in a movie-making studio, but other configurations of the system 200 are possible.

A 3D scene 202, which contains one or more models 204, can be loaded into an animation engine 206, for example by an animator. The animator may be tasked with, for example, animating the models 204 to follow a script that describes dialog between models 204, the movements of some models 204, etc. Once the animator has animated the 3D scene, the animation engine 206 can generate an animation sequence 208. The animation sequence 208 can be formatted, for example, as a series of frames. Each frame may be associated with, for example, a viewport into the 3D scene 202, and a location and transformation for each model 204 in the 3D scene 202.

The animation sequence 208 may be loaded into an animation analyzer 210 by, for example, a technical director. The technical director may be tasked with, for example, rendering and lighting the animation sequence 208. The animation analyzer 210 may examine the animation sequence to identify a render subsample 212 of the animation sequence 208. The render subsample 212 may be, for example, those frames selected from the animation sequence 208 to be rendered. The lighting subsample 214 may be, for example, those frames of the animation sequence 208 to be lit. The render subsample 212 and the lighting subsample 214 may be the same frames, partially overlapping frames, or different frames. In many cases, the frames of the render subsample 212 and the lighting subsample 214 are noncontiguous, but there are cases where contiguous frames in the render subsample 212 and/or the lighting subsample 214 are used.

To identify the render subsample 212 and the lighting subsample 214, the animation analyzer 210 can receive input from a user identifying identify the render subsample 212 and the lighting subsample 214. Additionally or alternatively, the animation analyzer 210 can apply one or more, optionally interchangeable, tests to the animation sequence 208. These tests may indicate, for example, particular frames of the animation sequence 208 that should be rendered and/or lit. Additionally or alternatively, the tests may indicate, for example, ranges of frames in the animation sequence 208 that should be sampled at particular rates (e.g., every fifth frame should be sampled). The render subsample 212 and the lighting subsample 214 may be a copy of some of the frames of the animation sequence 208, or they may be data that indicates some of the frames. For example, the render subsample 212 and the lighting subsample 214 may be a list of frame numbers, ranges and subsample rates, or any other appropriate form of data or metadata.

The render subsample 212, the lighting subsample 214, and/or the animation sequence 208 can be loaded into a render engine 216 by, for example, the technical director, to create a video 218 of the animation sequence 208. The render engine 216 can render and light the frames indicated by the render subsample 212 and the lighting subsample 214, respectively. To generate in-between frames, the rendered frames and lit frames may be warped according to the motion of the animation sequence 208. By doing so, the in-betweens may be synthesized using less computing resources than are needed for rendering or lighting operations performed on each frame between samples.

The synthesis of in-betweens may produce visual artifacts. These artifacts may be a function of, for example, the number of in-betweens between rendered/lit frames or the ratio of subsampled frames to all frames in the animation sequence, where a greater number and/or lower ratio can result is less computer resource utilization but more artifacts and a higher ratio can result in fewer artifacts but more resource utilization. Another type of artifact may be holes in the in-betweens, if no source pixels are available in preceding and following frames for a particular in-between pixel. A third source of artifacts may result from properties of some models 204 that pathologically cause artifacts in in-betweens, that is, the inclusion of the model 204 guaranties or makes very likely the creation of artifacts. For example, highly reflective or transparent materials may pathologically cause artifacts if they are in in-between frames. In some cases, artifacts can be minimized or reduced by revising the render subsample 212 and/or the lighting subsample 214. In many instances, the artifacts generated by the system 200 may on par or less than other artifacts known to exist in commonly used rendering techniques. However, while the creation of artifacts is possible, it is also possible to produce the video 218 without artifacts, or without artifacts that can be detected by a human viewer.

Although both rendering and lighting subsampling and in-between synthesis is described with respect to system 200, it is possible for a system to apply the subsample and in-between synthesis technique only to rendering or only to lighting. For example, a technical director may determine that there are sufficient computing resources available to render every frame of the animation sequence 208, but not to also light every frame. In this case, only the lighting subsample 214 may be used. In another example, the technical director may notice that an animation sequence calls for very little movement of models 204, but does call for quick and unpredictable lighting changes (e.g., the 3D scene 202 depicts a lighting check in an empty arena before a rock concert). In such an example, the render subsample 212 may be used, and not the lighting subsample 214.

The processes described for the system 200 may be used iteratively. For example, the system 200 may be used to make a video 218 for daily review. The early dailies, when, for example, the script may not be finalized or the director may not have a clear vision of how the animation sequence should proceed, may have relatively sparse render subsamples 212 and lighting subsamples 214. The later dailies, as more minor details are worked out, may have less sparse render subsamples 212 and lighting subsamples 214. This configuration may result is faster production of early dailies and slower, but more accurate, production of later dailies. In some cases, a 3D scene's final beauty video may be created by fully rendering and lighting every frame of the animation sequence 208. In other cases, it may be determined that the render subsamples 212 and lighting subsamples 214 may be used for the final beauty video 218, either because no artifacts are produced, or because the artifacts are acceptably minor.

Figure 3:
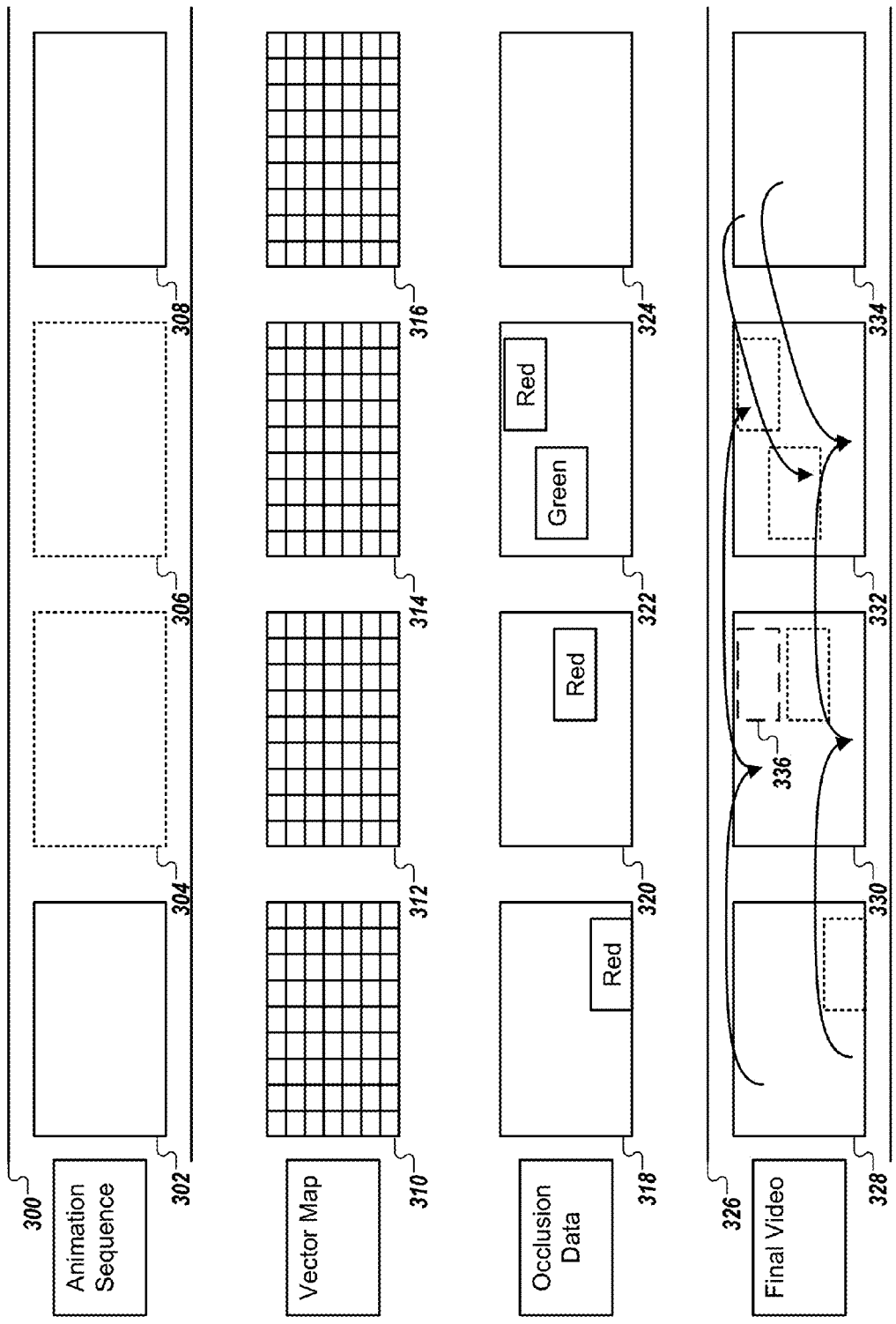
FIG. 3 schematically shows frames of a video being rendered, lit, and created.

FIG. 3 schematically shows frames 302-308 of an animation sequence 300 being rendered, lit, and created. For the animation sequence 300, an animation analyzer (e.g. animation analyzer 210) has identified frames 302 and 308 to be part of a render subsample and a lighting subsample. The frames 304 and 306 were not included in the render subsample and the lighting subsample and are thus to be synthesized by a render engine (e.g. the render engine 216).

An animation engine (e.g. animation engine 206), or any other appropriate computing component, can generate, for each frame 302-308 of the animation sequence 300, a corresponding vector map 310-316. That is, for frame 302, there may be a corresponding vector map 310, for frame 304, a vector map 312, etc. The vector map may contain a vector describing the movement of each pixel in each frame 302-308 to the next frame of the animation sequence 300. That is, if a pixel in frame 302 moves 2 positions horizontally and −1 positions vertically in frame 304, the corresponding vector in vector map 310 may hold a value of [2,−1]. The vector maps 310-216 may be filled regardless of if the corresponding frames 302-308 are included in a render subsample or a lighting subsample. The vector maps 302-308 may be created for both rendered and/or lit frames as well as in-between frames.

The animation engine, or any other appropriate computing component, can generate, for each frame 302-308 of the animation sequence 300, corresponding occlusion data 318-324 that shows where an object occludes, or hides from view, another object. That is, for frame 302, there may be corresponding occlusion data 318, for frame 304, occlusion data 320, etc. The occlusion data 318-324 may be, for example, an image of the same size and resolution as the frames 302-308. The red channel of the occlusion data 318-324 may be used to record pixels in the frames 302-308 that are occluded in the following frame, and the green channel may be used to record pixels that are occluded in the previous frame. For example, occlusion data 322 has a section colored green and a section colored red. The red section indicates pixels of the frame 306 that are occluded in the frame 308, and the green section indicates pixels of the frame 306 that are occluded in the frame 304. If an occlusion data 318-324 included any overlapping red and green sections, this would indicate a pixel of a frame is occluded in both the preceding and following frame. Such a situation may result in a hole in the final video 326 that can be, for example, edited by a technical director or left as a visual artifact.

The final video 326 includes frames 328-334. For ease of understanding, the occluded areas indicated by occlusion data 318-324 have been reproduced here with dotted lines in the final video 326. The frames 326 and 332, which correspond to the frames 302 and the frames 308, are rendered and lit by the render engine. The frames 330 and 332, which correspond to the frames 304 and 306, are synthesized by the render engine from the frames 328 and 334.

To synthesize the frames 330 and 332, the render engine warps unoccluded pixels of the frames 328 and 334, as illustrated by the arrows in the final video 326. For example, in frame 332, a pixel in an area that is not occluded in either previous or following frames is shown to be synthesized by warping pixels from frames 334 and 328, according to the vectors in the vector maps 310-314. A pixel in frame 332 that corresponds to a green area in the occlusion data 322 is synthesized by warping only a pixel from frame 334, as the green area indicates that the pixel was occluded in the frame 330. A pixel in frame 332 that corresponds to the red area in occlusion data 322 is synthesized by warping only a pixel from frame 330, which is found by warping a pixel in frame 328, as the red area indicates that the pixel was occluded in the frame 334. In this way, every pixel in the in-between frames 330 and 332 can be synthesized.

In some cases, a frame may be adjacent to an in-between. For example, frame 330 is adjacent to frame 332, which is an in-between frame. In such cases, as part of the synthesis of the frame 330, occlusion data in in-betweens between the frame 330 and the nearest rendered frame (i.e. frame 334) can be accumulated to determine which pixels are occluded between the frame 330 and the frame 334. The accumulated occlusion data 336 shows the area in frame 332 that is to be added to the occlusion data 320 when the frame 330 is to be synthesized. In some configurations, accumulated occlusion data is created in-line, that is, as part of the process of synthesizing the frame 330. In some other configurations, the accumulated occlusion data can be preprocessed before any frames are synthesized.

Figure 4:
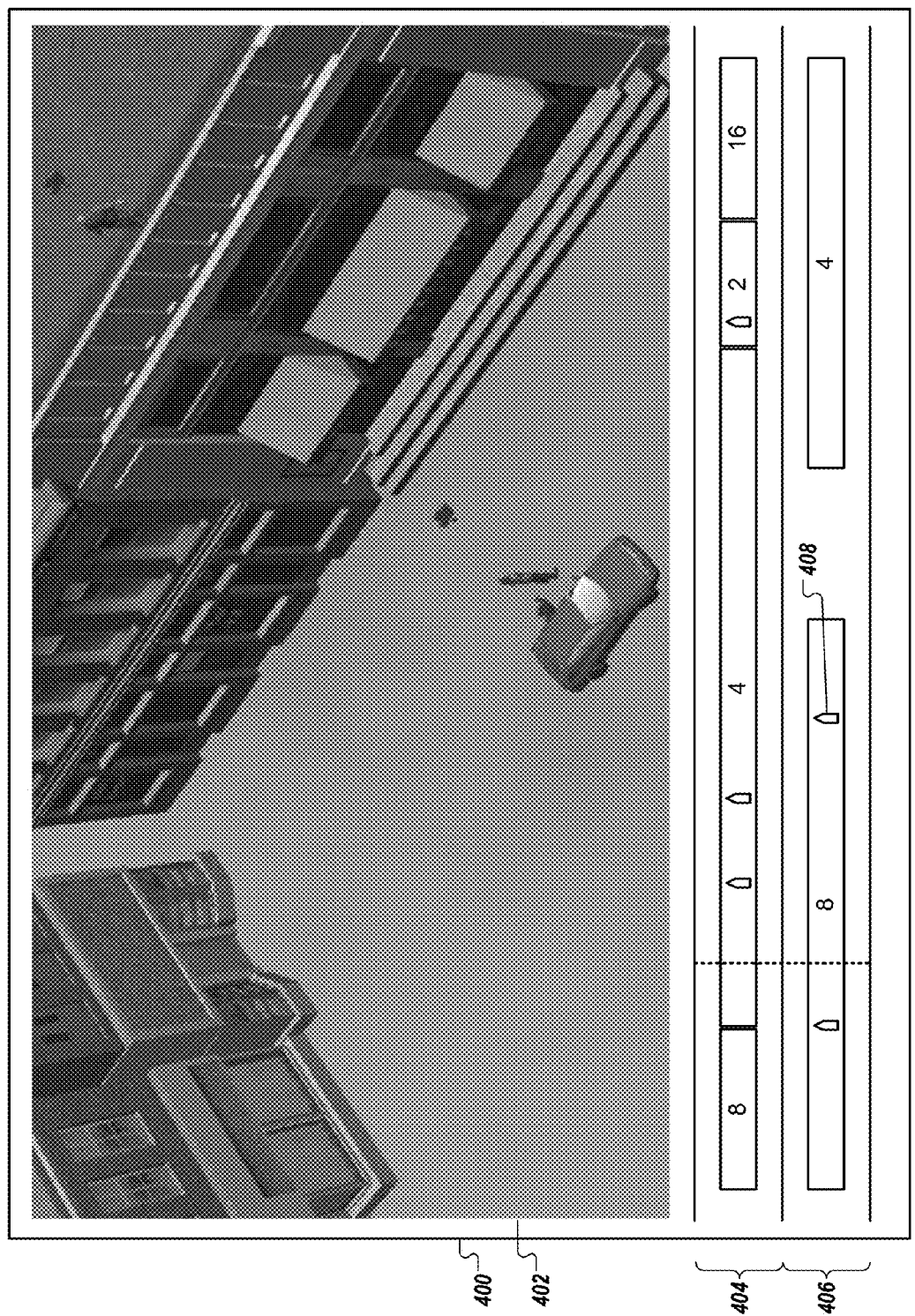
FIG. 4 is an example graphic user interface of a non-linear editor.

FIG. 4 is an example graphic user interface (GUI) 400 of a non-linear editor. The GUI 400 may be generated, for example, by a computer running an animation analyzer (e.g. the animation analyzer 210) and/or a render engine (e.g. the render engine 216). The GUI 400 may receive input from a user, such as technical director, through any appropriate input device such as a keyboard, mouse, track pad, or touch interface.

The GUI 400 includes a 3D view 402 of a 3D scene (e.g., the 3D scene 202) that is to be made into a video (e.g., the video 218). Below the view 402 are two tracks, a render-subsample track 404 and an illumination-subsample track 406. The render-subsample track 404 and illumination-subsample track 406 can show which of the animation frames are included in the render and illumination subsamples for the 3D scene. As shown here, range bars indicate that, for their ranges, frames are sampled every 8, 4, 2, or 16 frames; however any appropriate sample frequency may be used. Additionally or alternatives, tick marks, including tick mark 408, in the render-subsample track 404 and illumination-subsample track 406 can be used to show individual animation frames added to either the render or illumination subsample. The tick marked frames may be added to the appropriate subsample in addition to the frames selected based on sample rate, or they may be a constraint upon which frames may be selected as part of rate based sampling. Although not shown here other tracks may also be displayed under the view 402. For example, animation tracks for the models, cameras, and light sources may be shown.

The render-subsample track 404 and illumination-subsample track 406 may be user editable. For example, the render-subsample track 404 and illumination-subsample track 406 may be prepopulated by the animation analyzer and then presented to the technical director for refinement. Based on the technical director's human expertise and consideration, the technical director may decide to change the default in order to meet some goal, e.g. reduce processing requirement, and eliminate likely artifacts caused by a behavior not identified by the animation analyzer. To edit the render-subsample track 404 and illumination-subsample track 406, the technical director may change the sample rate of a range bar, change the length of a range bar, move a range bar or tick mark, and/or add or delete a range bar or tick mark. In some cases, the the render-subsample track 404 and illumination-subsample track 406 may initially be empty, and can be populated by the technical director adding ranges, sample rates, and tick marks manually.

Figure 5:
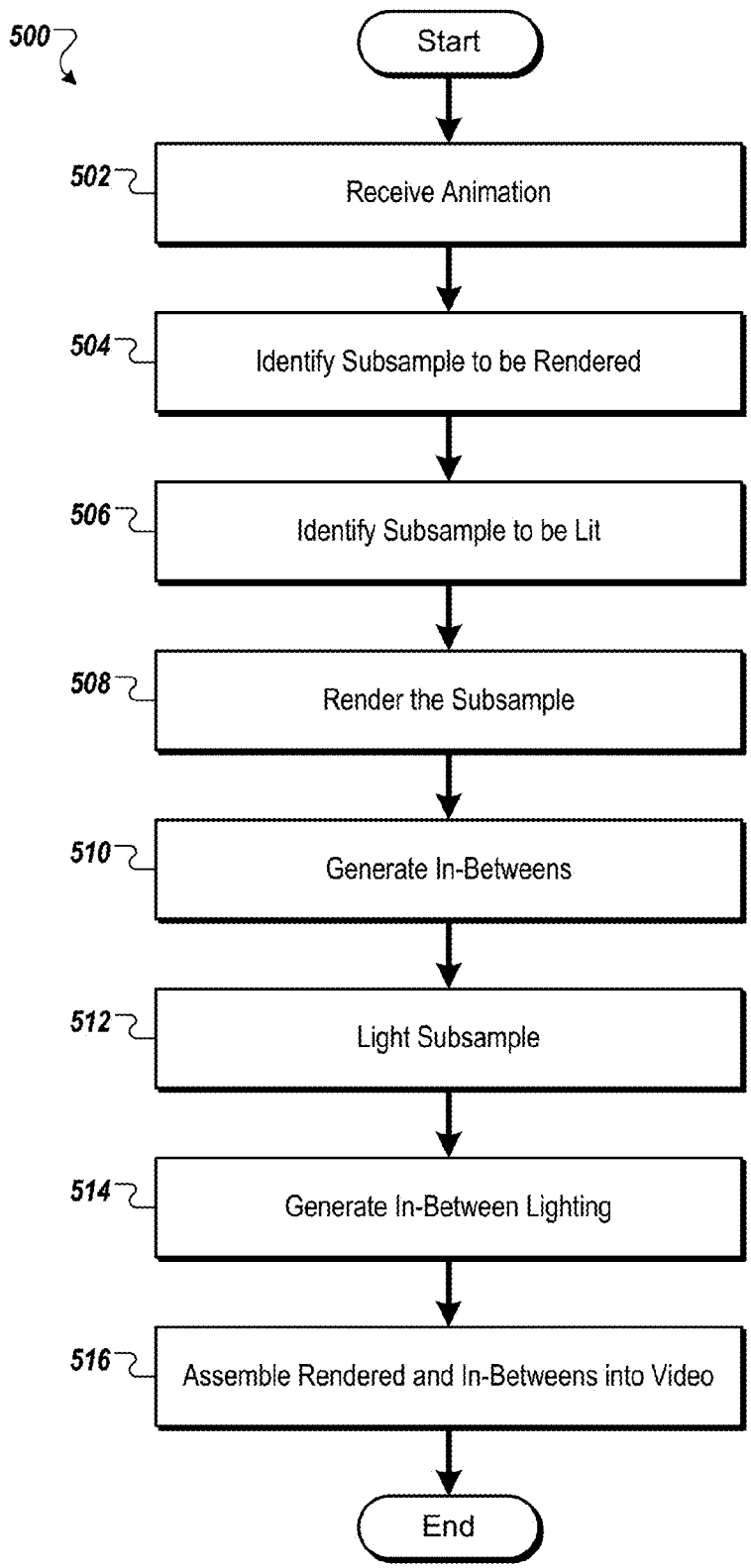
FIG. 5 is a flowchart of an example process for creating a video from an animated 3D scene.

FIG. 5 is a flowchart of an example process 500 for creating a video from an animated 3D scene. For convenience, the process 500 will be described as being performed by a system, for example, systems including one or more computing devices running an animation analyzer and/or rendering engine. However, another system, or combination of systems, can be used to perform the process.

The system receives an animation (502). For example, an animation analyzer (e.g. the animation analyzer 210) and/or a render engine (e.g. the render engine 216) can receive an animation sequence (e.g. the animation sequence 208) from an animation engine (e.g. the animation engine 206). The animation sequence may include, for example, frames of animation defining locations, orientations, and poses of models within a 3D scene and a viewport into the scene.

The system identifies a subsample to be rendered (504) and a subsample to be lit is identified (506). For example, the animation analyzer can determine a plurality of frames to be rendered. This identification of frames is, in some ways, analogous to the selection of keyframes from which a keyframe animation is interpolated. The rendered frames are frame from which in-betweens will be created by warping the rendered frames. In some cases, the subsample of frames to be rendered is the same as the subsample of frames to be lit. In some cases, the subsample of frames to be rendered is different than the subsample of frames to be lit.

The animation analyzer can use user input and/or one test or multiple tests to identify frames to be included in the render or lighting subsample. The tests may be the same or different for render than for lighting. In one test, the absolute value of all motion vectors for an image (e.g., vector maps 310-316) can be found. Based on that motion vector absolute value, the frame can be assigned a sample rate. All contiguous frames with the same sample rate can be compiled into a range (e.g. as shown in tracks 404 and 406), and the range can be sampled at the range's sample rate. For example, if a range of 20 frames has a sample rate of 4, every forth frame, for a total of 5 frames, may be selected from the range and added to the subsample. In another test, models in the animation sequence known to have particular properties are identified. These properties can include any property likely to cause artifacts when warped (e.g. an object with a large face foreshortened when viewed through the viewport). Every frame showing these objects can be added to the subsamples, ensuring that no frame showing these objects will be created by warping. In some cases, the user input may edit or refine the subsamples suggested by the tests. In other cases, user input alone may specify subsamples.

The system renders the subsample (508). For example, the render engine can render the subsample of frames to be rendered. The render engine can use any suitable process for object and scene rendering. The result of the rendering can be, for example, a pixel map for each frame in the subsample, the pixel map showing the (possibly unlit or ambiently lit) 3D scene from the point of view of the viewport for that frame.

The system identifies unrendered frames are identified and generates in-betweens (510). For example, the render engine can identify all frames of the animation sequence that have not been rendered. The render engine can then synthesize those frames from the rendered frames.

In some configurations, the render engine can generate or receive a vector map for each frame of the animation. The vector map can hold vectors showing where a pixel, or point on a model from the viewports point of view, moves from the current frame to the next frame. The animation engine can generate the in-betweens by warping adjacent frames according to the associated vector maps.

For example, consider a frame n that follows a rendered or already synthesized frame n−1 and precedes a rendered or already synthesized frame n+1. To fill the pixels of frame n, the render engine can warp the frame n−1 by the vectors of the vector map associated with the frame n−1 and/or warp the frame n+1 by the inverse of the vector in the vector map associated with the frame n. For example, if pixel [9, 9] in frame n−1 has an associated vector [2,−4], the render engine can copy the pixel color in [9, 9] of frame n−1 and place the color value in [9+2, 9−4], or [11, 5], of frame n. Similarly, if pixel [99, 99] of frame n+1 has an associated vector [−7, 14] in the vector map of frame n, the render engine can copy the pixel color in [99, 99] of frame n+1 and place the color value in [99+7, 99−14], or [106, 85], of frame n. If warping from frames n−1 and n+1 into frame n produces a collision, that is, two or more different colors copied into the same pixel, the two or more colors may be mixed, possibly according to any appropriate weighting scheme and/or color model.

In some configurations, the render engine can generate or receive occlusion data for each frame of the animation. The occlusion data can hold information about which objects in the 3D scene occlude or are occluded by other objects in preceding and following frames, from the point of view of the viewport. The render engine can use this occlusion data, for example, when synthesizing an in-between. For example, if a pixel in frame n is occluded in frame n+1, the render engine may warp only the frame n−1 to find the color value for the pixel in frame n. In cases where one or more in-betweens are between a frame to be synthesized and a rendered frame, the render engine can accumulate the occlusion data of the in-between frames and apply the accumulated occlusion data to the frame to by synthesized.

The system lights the subsample (512). For example, the render engine can light the subsample of frames to be lit. The render engine can use any suitable process for object and scene lighting. The result of the rendering can be, for example, a lighting map for each frame of the subsample, the lighting map showing the lighting of the 3D scene from the point of view of the viewport for that frame.

Unlit frames are identified and lighting in-betweens are generated (514). For example, the render engine can identify all frames of the animation sequence that have not been lit. The render engine can then synthesize those frames from the lit frames. In some configurations, the render engine can warp the lighting maps of lit frames to synthesize lighting maps for unlit frames in substantially the same processes by which pixel maps are warped to create pixel maps for unrendered frames.

The rendered and in-betweens are assembled into a video (516). For example, the render engine can combine the rendered and in-betweens into a single video file ordered by frame number. The render engine can save this video file to a computer readable medium, transfer the file to another computer, or print the video to film or other hard-copy medium.

FIG. 6 is a schematic diagram that shows an example of a computing system 600. The computing system 600 can be used for some or all of the operations described previously, according to some implementations. The computing system 600 is intended to represent various forms of digital computers, such as laptops, desktops, workstations, personal digital assistants, servers, blade servers, mainframes, personal digital assistants, cellular telephones, smart-phones, tablet computers and other similar computing devices.

The computing system 600 includes a processor 610, a memory 620, a storage device 630, and an input/output device 640. Each of the processor 610, the memory 620, the storage device 630, and the input/output device 640 are interconnected using a system bus 650. The processor 610 is capable of processing instructions for execution within the computing system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the computing system 600. In some implementations, the memory 620 is a computer-readable medium. In some implementations, the memory 620 is a volatile memory unit. In some implementations, the memory 620 is a non-volatile memory unit.

The storage device 630 is capable of providing mass storage for the computing system 600. In some implementations, the storage device 630 is a computer-readable medium. In various different implementations, the storage device 630 may be a floppy disk device, a hard disk device, an optical disk device, or a tape device.

The input/output device 640 provides input/output operations for the computing system 600. In some implementations, the input/output device 640 includes a keyboard and/or pointing device. In some implementations, the input/output device 640 includes a display unit for displaying graphical user interfaces. In some implementations, the input/output device 640 includes a digitizer, touch sensor, and/or three dimensional motion sensing device.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A computer system comprising:
    an animation analyzer configured to:
        receive an animation sequence for a 3D virtual scene, the animation sequence indicating movements of one or more objects in the 3D scene, the animation sequence including a plurality of frames and each of the plurality of the frames representing the 3D virtual scene at a specific time point from a particular viewpoint;
        for each of the plurality frames:
            identify an absolute value of a motion vector describing the movement of a pixel from the frame to a next frame in the animation sequence; and
            assign a sample rate to the frame based on the identified absolute value such that the plurality of the frames have the same sample rate;
        select one or more frames in the plurality of the frames as a first set of key frames in the animation sequence based on the sample rate;
        send, to a rendering engine, indication information indicating the first set of key frames in the animation sequence; and
    the rendering engine configured to:
        receive the animation sequence;
        receive, from the animation analyzer, the indication information;
        render the first set of key frames; and
        generate in-between frames between the first set of key frames based on the rendered first set of key frames; and
        assemble the rendered first set of key frames and the generated in-between frames into a video sequence depicting the animation sequence.

2. The computer system of claim 1, wherein the render engine is further configured to light the first set of key frames and to light the in-between frames based on the lighted first set of key frames.

3. The computer system of claim 1, wherein selecting the one or more frames in the plurality of the frames as the first

13 set of key frames based on the sample rate comprises sampling the plurality of the frames at the sample rate.

4. The computer system of claim 1, wherein the render engine is further configured to receive, for each of the frames of the animation sequence, a vector map describing the movement of the pixels from a current frame of the animation sequence to a next frame of the animation sequence; and
 wherein, to generate the in-between frames based on the rendered first set of key frames, the render engine is configured to use the vector map to warp pixels in the first set of key frames.

5. The computer system of claim 1, wherein the render engine is further configured to receive occlusion data for each of rendered frames, the occlusion data stored in two masks for each rendered frame; and
 wherein, the render engine is further configured to use the occlusion data to select for source pixels of a rendered frame to warp.

6. The computer system of claim 5, wherein:
 a pixel in a given in-between frame is generated using a previous and a following rendered frames if the pixel is not occluded in either the previous or following rendered frames;
 a pixel in a given in-between frame is generated using only the previous rendered frame if the pixel is occluded in the following rendered frame and not occluded in the previous rendered frame; and
 a pixel in a given in-between frame is generated using only the following rendered frame if the pixel is occluded in the previous rendered frame and not occluded in the following rendered frame.

7. A computer implemented method comprising:
 receiving an animation sequence for a 3D virtual scene, the animation sequence indicating movements of one or more objects in the 3D scene, the animation sequence including a plurality of frames and each of the plurality of the frames representing the 3D virtual scene at a specific time point from a particular viewpoint;
 for each of the plurality frames:
  identifying an absolute value of a motion vector describing the movement of a pixel from the frame to a next frame in the animation sequence; and
  assigning a sample rate to the frame based on the identified absolute value such that the plurality of the frames have the same sample rate;
 selecting one or more frames in the plurality of the frames as a first set of key frames based on the sample rate;
 sending, to a render engine, indication information indicating the first set of key frames for generating a video sequence depicting the animation sequence based on the indication information, wherein the generation of the video sequence comprises:
 rendering the first set of key frames;
 generating in-between frames between the first set of key frames based on the rendered first set of key frames; and
 assembling the rendered and lit frames into a video sequence depicting the animation sequence.

8. The method of claim 7, wherein the render engine is further configured to light the first set of key frames and to light the in-between frames based on the lighted first set of key frames.

9. The method of claim 7, wherein selecting the one or more frames in the plurality of the frames as the first set of key frames based on the sample rate comprises sampling the plurality of the frames at the sample rate.

14

10. A computer implemented method comprising:
 receiving an animation sequence for a 3D virtual scene, the animation sequence indicating movements of one or more objects in the 3D scene, the animation sequence including a plurality of frames and each of the plurality of the frames representing the 3D virtual scene at a specific time point from a particular viewpoint;
 for each of the plurality frames:
  identifying an absolute value of a motion vector describing the movement of a pixel from the frame to a next frame in the animation sequence; and
  assigning a sample rate to the frame based on the identified absolute value such that the plurality of the frames have the same sample rate;
 selecting one or more frames in the plurality of the frames as a first set of key frames based on the sample rate;
 receiving, from an animation analyzer, indication information indicating the first set of key frames in the animation sequence; and
 generating a video sequence depicting the animation sequence based on the indication information, wherein the generation of the video sequence comprises:
 rendering, by a render engine, the first set of key frames;
 generating the in-between frames between the first set of key frames based on the rendered first set of key frames; and
 assembling the rendered first set of key frames and the generated in-between frames into the video sequence depicting the animation sequence.

11. The method of claim 10 further comprising:
 receiving, for each of the frames of the animation sequence, a vector map describing the movement of the pixels from a current frame of the animation sequence to a next frame of the animation sequence; and
 wherein generating the in-between frames based on the rendered first set of key frames, the render engine is configured to use the vector map to warp pixels in the first set of key frames.

12. The method of claim 11, wherein:
 a pixel in a given in-between frame is generated using a previous and a following rendered frames if the pixel is not occluded in either the previous or following rendered frames;
 a pixel in a given in-between frame is generated using only the previous rendered frame if the pixel is occluded in the following rendered frame and not occluded in the previous rendered frame; and
 a pixel in a given in-between frame is generated using only the following rendered frame if the pixel is occluded in the previous rendered frame and not occluded in the following rendered frame.

13. A computer system comprising:
 an animation analyzer configured to:
  receive an animation sequence for a 3D virtual scene, the animation sequence indicating movements of one or more objects in the 3D scene, the animation sequence including a plurality of frames and each of the plurality of the frames representing the 3D virtual scene at a specific time point from a particular viewpoint;
  for each of the plurality frames:
   identify an absolute value of a motion vector describing the movement of a pixel from the frame to a next frame in the animation sequence; and
   assign a sample rate to the frame based on the identified absolute value such that the plurality of the frames have the same sample rate;

select one or more frames in the plurality of the frames as a first set of key frames based on the sample rate;

send, to a rendering engine, indication information indicating the first set of key frames in the animation sequence; and the rendering engine configured to:
  receive the animation sequence;
  receive, from the animation analyzer, the indication information;
  render the first set of key frames; and
  generate the in-between frames between the first set of key frames based on the rendered first set of key frames; and
  assemble the rendered first set of key frames and the generated in-between frames into a video sequence depicting the animation sequence.

14. The computer system of claim 13, wherein the render engine is further configured to light the first set of key frames and to light the in-between frames based on the lighted first set of key frames.

15. The computer system of claim 13, wherein selecting the one or more frames in the plurality of the frames as the first set of key frames based on the sample rate comprises sampling the plurality of the frames at the sample rate.

16. The computer system of claim 13, wherein the render engine is further configured to receive, for each of the frames of the animation sequence, a vector map describing the movement of the pixels from a current frame of the animation sequence to a next frame of the animation sequence; and wherein, to generate the in-between frames based on the rendered first set of key frames, the render engine is configured to use the vector map to warp pixels in the first set of key frames.

17. The computer system of claim 16 wherein the render engine receives occlusion data for each of the lit frames, the occlusion data stored in two masks for each lit frame; and wherein, to the in-between frames based on the rendered first set of key frames, the render engine is configured to use the occlusion data to select for source pixels of a lit frame to warp.

* * * * *